US012675846B2

(12) United States Patent
Takeshita

(10) Patent No.: US 12,675,846 B2
(45) Date of Patent: Jul. 7, 2026

(54) HIGH FREQUENCY EMPHASIS AMOUNT CONTROL DEVICE

(71) Applicant: JVCKENWOOD Corporation, Yokohama (JP)

(72) Inventor: Hiroshi Takeshita, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 257 days.

(21) Appl. No.: 18/673,579

(22) Filed: May 24, 2024

(65) Prior Publication Data

US 2024/0311965 A1 Sep. 19, 2024

Related U.S. Application Data

(63) Continuation-in-part of application No. PCT/JP2022/027990, filed on Jul. 19, 2022.

(30) Foreign Application Priority Data

Dec. 10, 2021 (JP) ................................. 2021-200758

(51) Int. Cl.
*G06T 3/4084* (2024.01)
*G06T 5/10* (2006.01)

(52) U.S. Cl.
CPC .............. *G06T 3/4084* (2013.01); *G06T 5/10* (2013.01); *G06T 2207/20056* (2013.01); *G06T 2207/20132* (2013.01)

(58) Field of Classification Search
None
See application file for complete search history.

(56) References Cited

U.S. PATENT DOCUMENTS 12,548,122 B2 * 2/2026 Wu ........................... G06T 5/70

FOREIGN PATENT DOCUMENTS

| JP | 2001-16480 | * | 1/2001 |
| JP | 2007-336064 | * | 6/2006 |
| JP | 2001016480 | A | 1/2019 |

* cited by examiner

*Primary Examiner* — Jennifer Mehmood
*Assistant Examiner* — Nancy Bitar
(74) *Attorney, Agent, or Firm* — Nath, Goldberg & Meyer; Jerald L. Meyer

(57) ABSTRACT

A first discrete Fourier transform unit generates a first frequency spectrum by two-dimensional discrete Fourier transform of an input image signal. A second discrete Fourier transform unit generates a second frequency spectrum by two-dimensional discrete Fourier transform of an output image signal output from a high frequency emphasis circuit. A first and second high frequency component index generators generate a first and second high frequency component indices indicating a total amount of high frequency components based on the first and second frequency spectra, respectively. A high frequency component emphasis ratio calculator calculates a high frequency component emphasis ratio which is a ratio between a first high frequency component index and a second high frequency component index. An emphasis amount controller generates an emphasis amount control value based on a high frequency component emphasis ratio and a target emphasis ratio, and supplies it to the high frequency emphasis circuit.

5 Claims, 12 Drawing Sheets

HIGH FREQUENCY EMPHASIS AMOUNT CONTROL DEVICE

CROSS REFERENCE TO RELATED APPLICATIONS

This application is a continuation of PCT Application No. PCT/JP2022/027990, filed on Jul. 19, 2022, and claims the priority of Japanese Patent Application No. 2021-200758, filed on Dec. 10, 2021, the entire contents of both of which are incorporated herein by reference.

BACKGROUND

The present disclosure relates to a high frequency emphasis amount control device.

A high frequency emphasis circuit is used to emphasize high frequency components of an image to improve the sharpness of the image displayed on an image display device (see Japanese Unexamined Patent Application Publication No. 2001-16480).

SUMMARY

When high frequency components of an image are emphasized by a high frequency emphasis circuit, an appropriate emphasis amount depends on contents of the image. A user of an image display device manually sets an emphasis amount of the high frequency components while viewing the image displayed on the image display device. For users, setting the emphasis amount manually is cumbersome. Furthermore, when a user sets the emphasis amount manually, it is difficult to set appropriate emphasis amount since the high frequency components are emphasized too much or the degree of emphasis is too little. Therefore, it is desirable to present a high frequency emphasis amount control device which can automatically emphasize the high frequency components with an appropriate emphasis amount.

An aspect of one or more embodiments provides a high frequency emphasis amount control device including: a first discrete Fourier transform unit configured to generate a first frequency spectrum by two-dimensional discrete Fourier transform of an input image signal; a second discrete Fourier transform unit configured to generate a second frequency spectrum by two-dimensional discrete Fourier transform of an output image signal output from a high frequency emphasis circuit; a first high frequency component index generator configured to generate a first high frequency component index indicating a total amount of high frequency components based on the first frequency spectrum; a second high frequency component index generator configured to generate a second high frequency component index indicating a total amount of high frequency components based on the second frequency spectrum; a high frequency component emphasis ratio calculator configured to calculate a high frequency component emphasis ratio which is a ratio between the first high frequency component index and the second high frequency component index; and an emphasis amount controller configured to supply an emphasis amount control value to the high frequency emphasis circuit, for controlling to increase an emphasis amount of the high frequency component of the input image signal by the high frequency emphasis circuit when the high frequency component emphasis ratio is smaller than a target emphasis ratio, for controlling to decrease the emphasis amount of the high frequency component of the input image signal by the high frequency emphasis circuit when the high frequency component emphasis ratio is larger than the target emphasis ratio, and for controlling not to change the emphasis amount of the high frequency component of the input image signal by the high frequency emphasis circuit when the high frequency component emphasis ratio coincides with the target emphasis ratio.

DETAILED DESCRIPTION

Hereinafter, a high frequency emphasis amount control device according to each embodiment will be described with reference to the accompanying drawings.

First Embodiment

Figure 1:
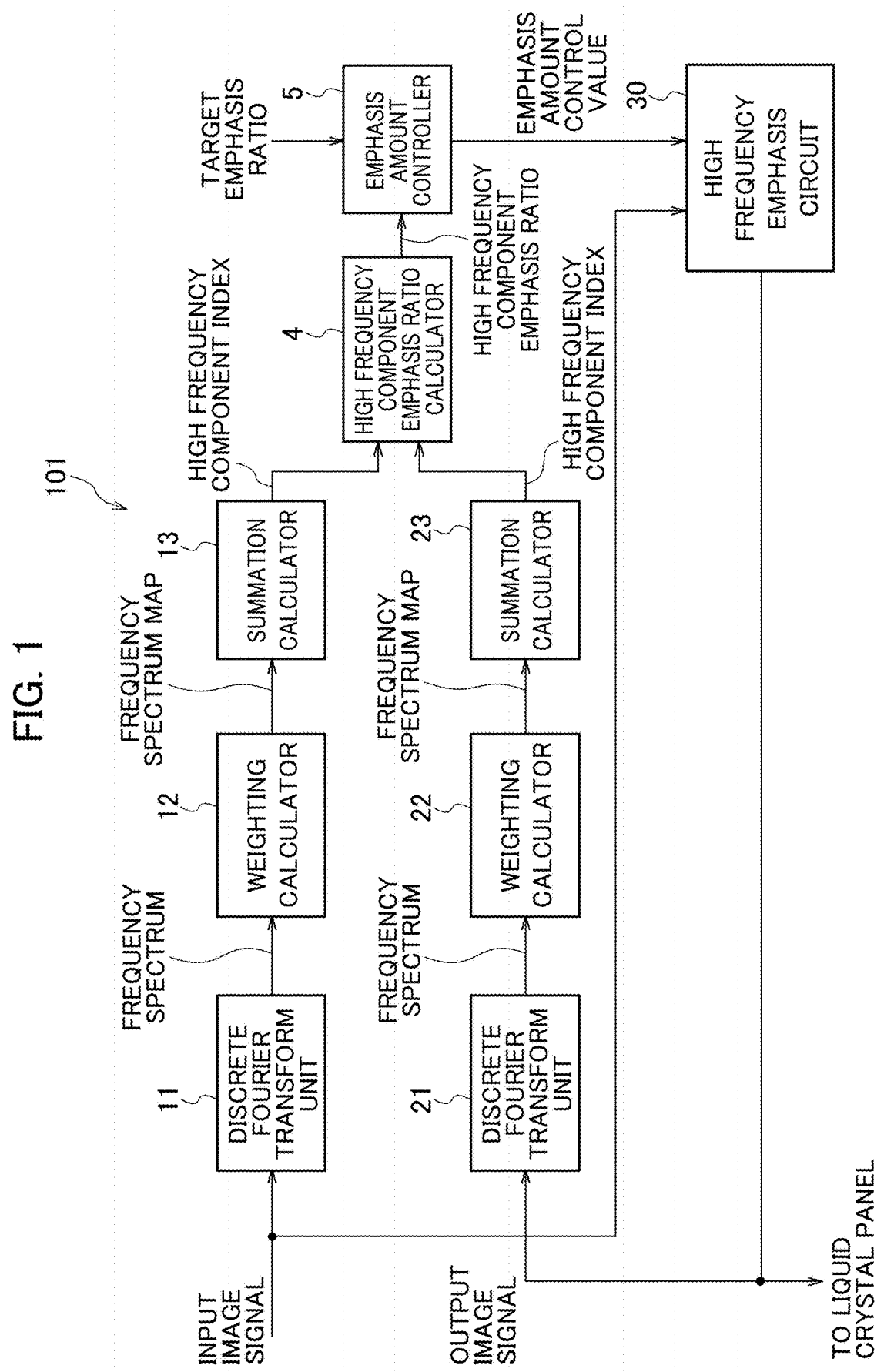
FIG. 1 is a block diagram illustrating a high frequency emphasis amount control device according to a first embodiment.

FIG. 1 shows a high frequency emphasis amount control device 101 according to a first embodiment. The high frequency emphasis amount control device 101 includes a discrete Fourier transform unit 11 (first discrete Fourier transform unit), a weighting calculator 12 (first weighting calculator), and a summation calculator 13 (first summation calculator). Furthermore, the high frequency emphasis amount control device 101 includes a discrete Fourier transform unit 21 (second discrete Fourier transform unit), a weighting calculator 22 (second weighting calculator), a summation calculator 23 (second summation calculator), a high frequency component emphasis ratio calculator 4, and an emphasis amount controller 5. The high frequency emphasis amount control device 101 controls an emphasis amount when the high frequency emphasis circuit 30 emphasizes high frequency components of an input image signal.

The high frequency emphasis amount control device 101 and the high frequency emphasis circuit 30 shown in FIG. 1 can be mounted on any image display device. As an example, it is assumed that the image display device is a medical monitor in which a physician diagnoses a patient by viewing a photographic image taken of the human body by a photographic device such as an X-ray device, a computed tomography (CT) device, or a magnetic resonance imaging (MRI) device. A photographic image used by a physician for diagnosis shall be called a medical image.

Medical images are stored in a picture archiving and communication system (PACS) server, and a workstation reads the medical images from the PACS server and displays them on a medical monitor. Typically, the medical images conform to the Digital Imaging and Communications in Medicine (DICOM) standard and is displayed on the medical monitor by software called a DICOM viewer.

In FIG. 1, the discrete Fourier transform unit 11 performs a two-dimensional discrete Fourier transform of an input image signal that is a medical image displayed on a medical monitor. The discrete Fourier transform unit 21 performs a two-dimensional discrete Fourier transform of an output image signal output from the high frequency emphasis circuit 30. Typically, the discrete Fourier transform units 11 and 21 respectively perform a discrete Fourier transform of the input image signal and the output image signal using an algorithm of Fast Fourier Transform (FFT).

The weighting calculators 12 and 22 respectively multiply the two-dimensional frequency spectrum output from the discrete Fourier transform units 11 and 21 by a weighting filter for extracting the high frequency components to generate a frequency spectrum map for evaluation. The frequency spectrum output from the discrete Fourier transform unit 11 is a first frequency spectrum, and the frequency spectrum output from the discrete Fourier transform unit 21 is a second frequency spectrum. The frequency spectrum map generated by the weighting calculator 12 is a first frequency spectrum map, and the frequency spectrum map generated by the weighting calculator 22 is a second frequency spectrum map.

Figure 2:
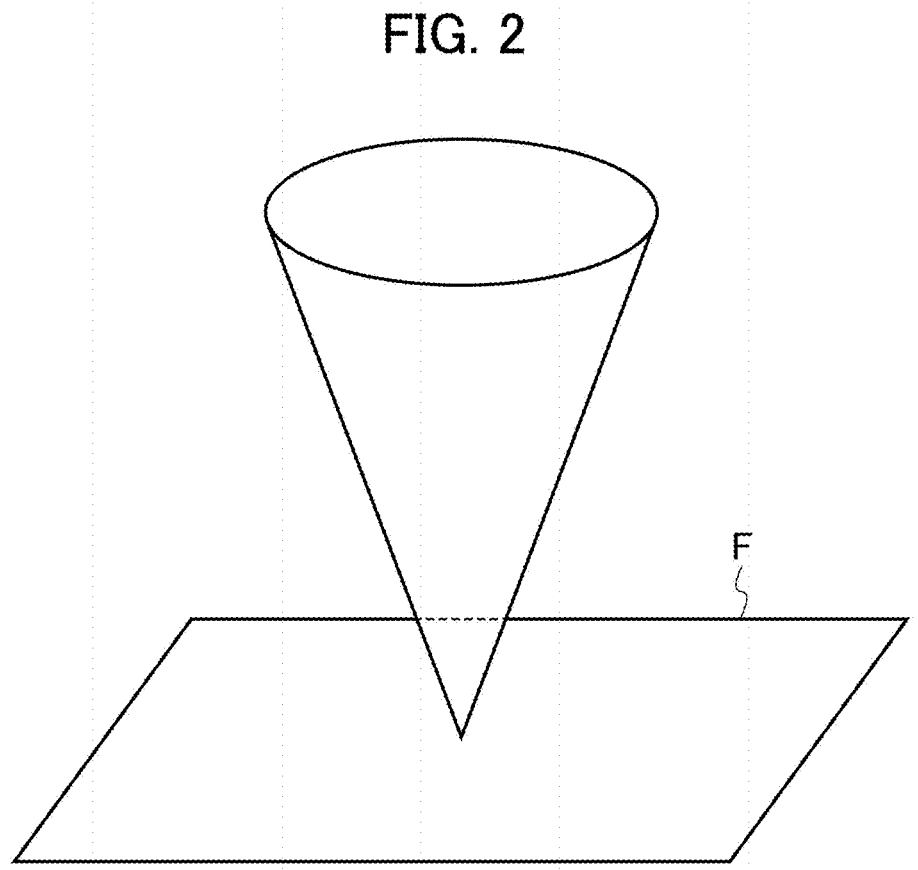
FIG. 2 is a conceptual diagram illustrating a weighting filter by which weighting calculators 12 and 22 in FIGS. 1, 9, and 12 multiply the frequency spectrum.

FIG. 2 conceptually shows a weighting filter by which the weighting calculators 12 and 22 multiply the frequency spectrum. As shown in FIG. 2, the weighting filter preferably uses an inverted cone-like filter in which a center of a frame F of an input image signal and an output image signal has a value of 0 and the value increases as the position moves away from the center.

When the weighting calculators 12 and 22 multiply the frequency spectrum by the inverted cone-like filter shown in FIG. 2, low frequency components included in the frequency spectrum are removed and high frequency components are increased, thereby obtaining a frequency spectrum map processed so that the high frequency components become dominant.

Figure 3A:
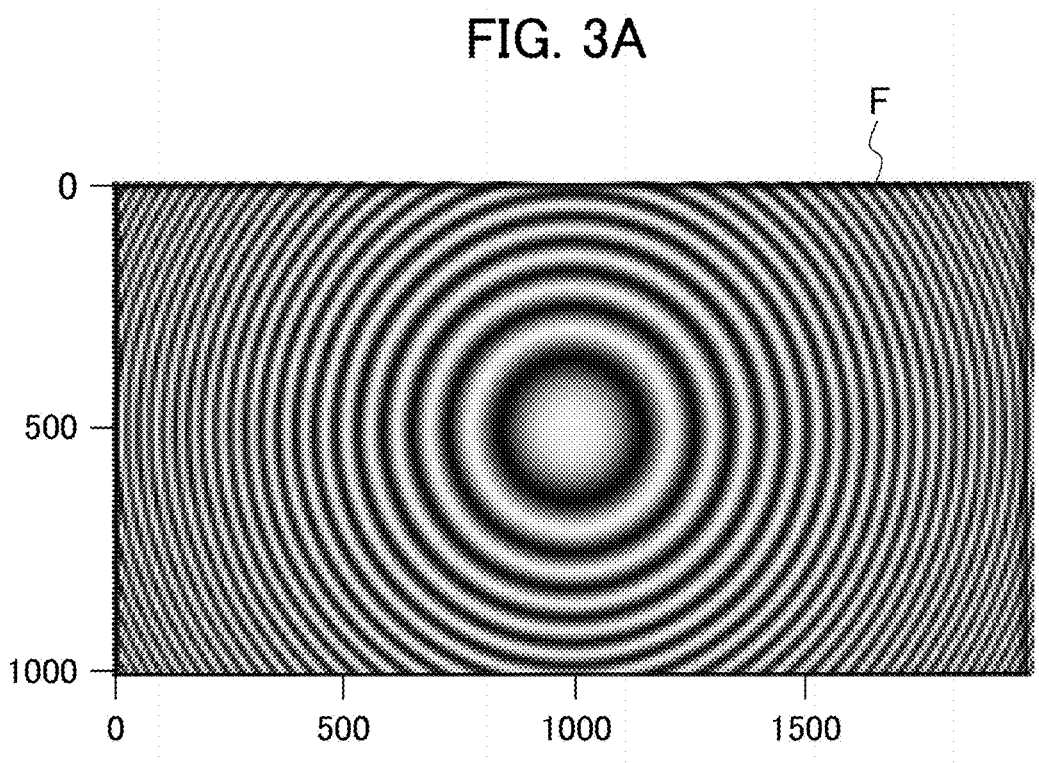
FIG. 3A is a diagram illustrating a frame for displaying a circular zone plate.

The frequency spectrum maps generated by the weighting calculators 12 and 22 will be described with reference to FIGS. 3A to 3E and FIGS. 4A to 4E. FIG. 3A shows a frame F displaying a circular zone plate (CZP) as an example of an image having relatively little high frequency components. FIG. 4A shows a frame F in which the circular zone plate is reduced and placed in the center as an example of an image having relatively many high frequency components. The frame F shown in FIGS. 3A and 4A has a resolution of full HD of 1920 pixels in a horizontal direction and 1080 pixels in a vertical direction.

Figure 3B:
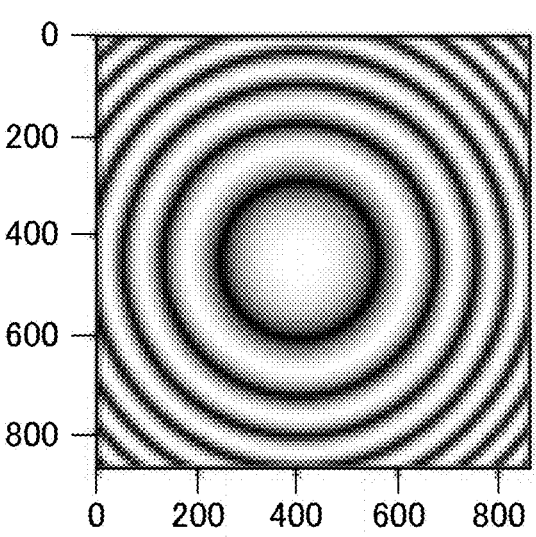
FIG. 3B is a diagram illustrating a center portion in FIG. 3A extracted as a partial region.
Figure 3C:
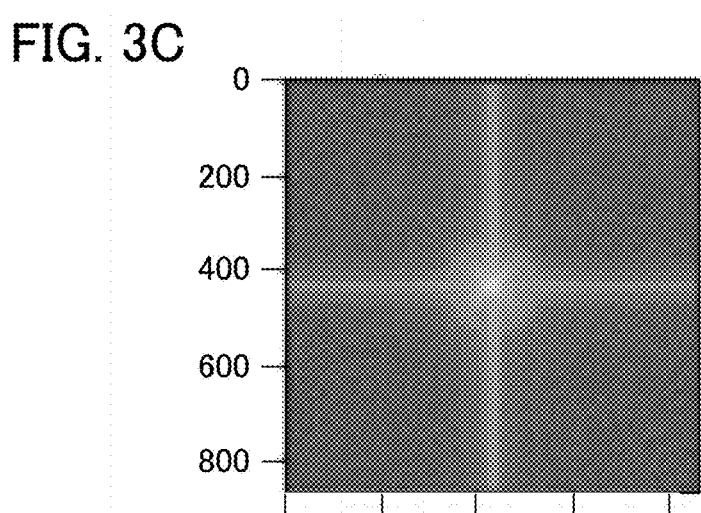
FIG. 3C is a diagram illustrating a frequency spectrum obtained by two-dimensional discrete Fourier transform of the partial region of FIG. 3B by the discrete Fourier transform unit 11 in FIG. 1.
Figures 4A, 4B:
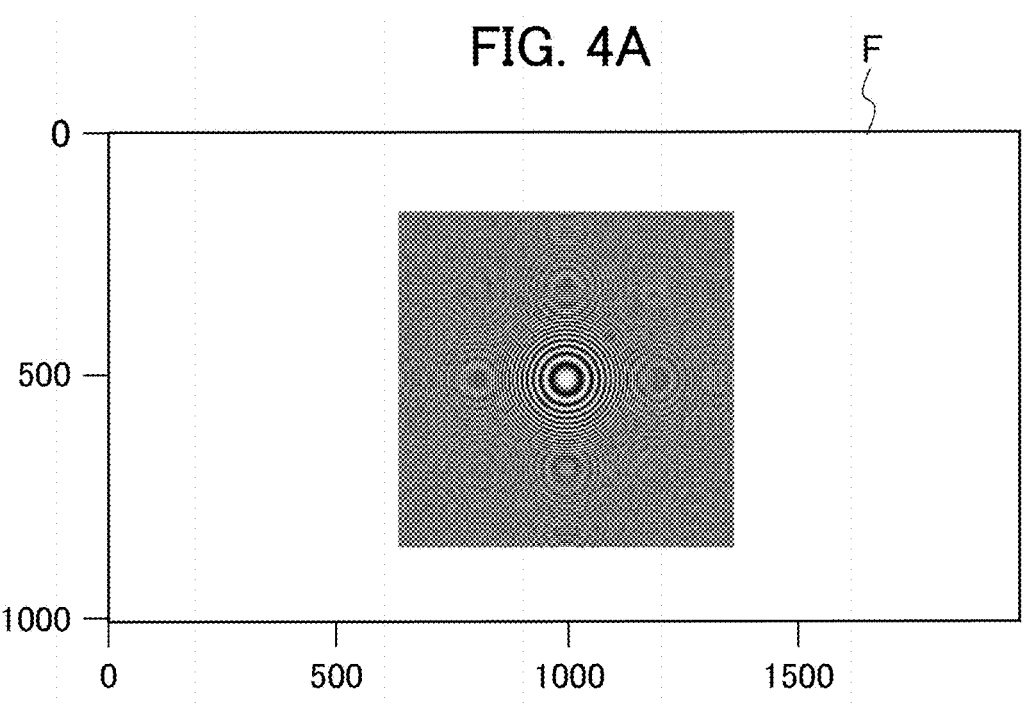
FIG. 4A is a diagram illustrating a frame in which the circular zone plate is decreased in size and arranged in the center.
FIG. 4B is a diagram illustrating a center portion in FIG. 4A extracted as a partial region.

FIG. 3B shows a center portion of the frame F shown in FIG. 3A extracted as a partial region in a range of about 800 pixels in the horizontal direction and about 800 pixels in the vertical direction. FIG. 3C shows a frequency spectrum obtained by two-dimensional discrete Fourier transform of the partial region of FIG. 3B by the discrete Fourier transform unit 11. The center portion of the frequency spectrum shown in FIG. 3C shows low frequency components, and a periphery portion shows high frequency components. In the periphery portion, the higher the frequency, the larger the value, and the whitish color is displayed.

Figure 3D:
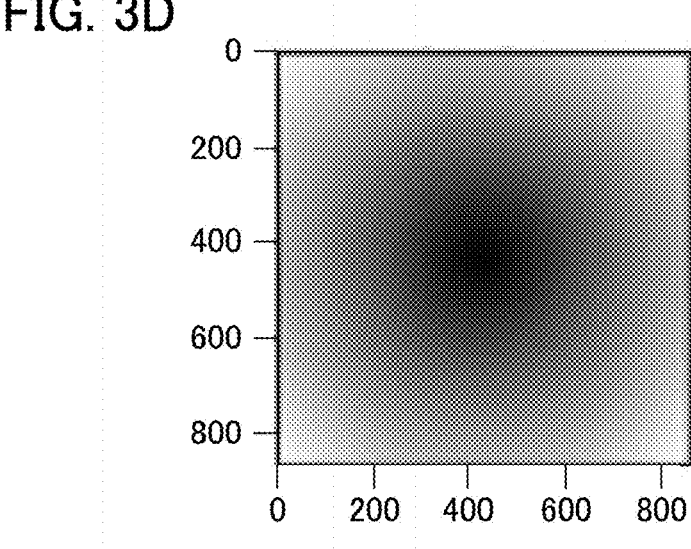
FIG. 3D is a diagram illustrating a weighting filter by which the weighting calculator 12 in FIG. 1 multiplies the frequency spectrum.
Figure 3E:
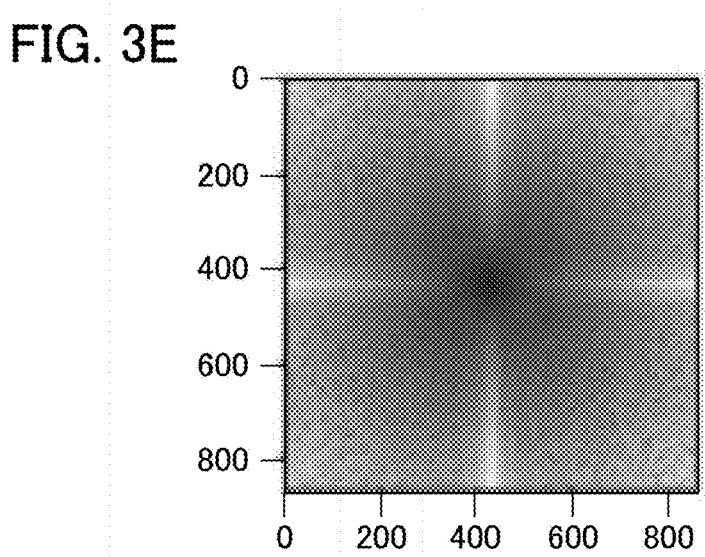
FIG. 3E is a diagram illustrating a frequency spectrum map obtained by the weighting calculator 12 in FIG. 1 multiplying the frequency spectrum shown in FIG. 3C by the weighting filter shown in FIG. 3D.

FIG. 3D shows a weighting filter by which the weighting calculator 12 multiplies the frequency spectrum. FIG. 3D corresponds to the weighting filter shown in FIG. 2. In FIG. 3D, the darker the color, the closer the value is to zero, and the whiter the color, the greater the value. FIG. 3E shows a frequency spectrum map by the weighting calculator 12 multiplying the frequency spectrum shown in FIG. 3C by the weighting filter shown in FIG. 3D. The low frequency component in the center of the frequency spectrum is removed, and the value is reduced and displayed in black.

Figure 4C:
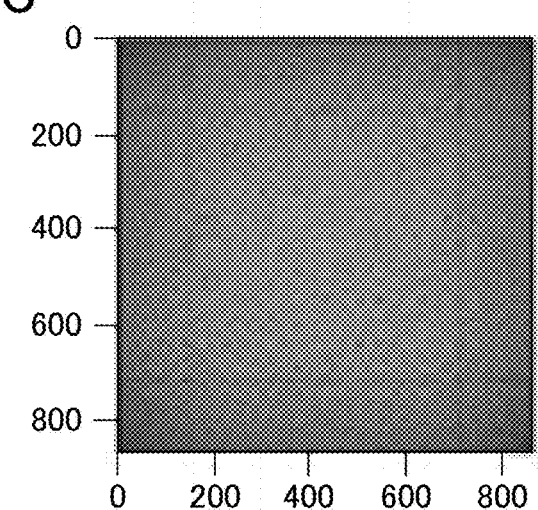
FIG. 4C is a diagram illustrating a frequency spectrum obtained by two-dimensional discrete Fourier transform of the partial region of FIG. 4B by the discrete Fourier transform unit 11 in FIG. 1.
Figure 4D:
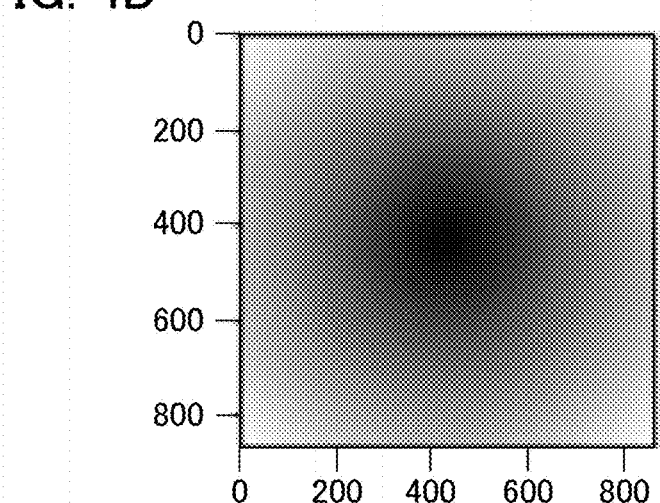
FIG. 4D is a diagram illustrating a weighting filter by which the weighting calculator 12 in FIG. 1 multiplies the frequency spectrum.

FIG. 4B shows a center portion of the frame F shown in FIG. 4A extracted as a partial region in a range of about 800 pixels in the horizontal direction and about 800 pixels in the vertical direction. FIG. 4C shows a frequency spectrum obtained by two-dimensional discrete Fourier transform of the partial region in FIG. 4B by the discrete Fourier transform unit 11. As can be seen by comparing FIG. 3C with FIG. 4C, the frequency spectrum shown in FIG. 4C has as a whole larger values and the whitish color is displayed, since the partial region shown in FIG. 4B has more high frequency components than the partial region shown in FIG. 3B. FIG. 4D shows the same weighting filter as in FIG. 3D.

Figure 4E:
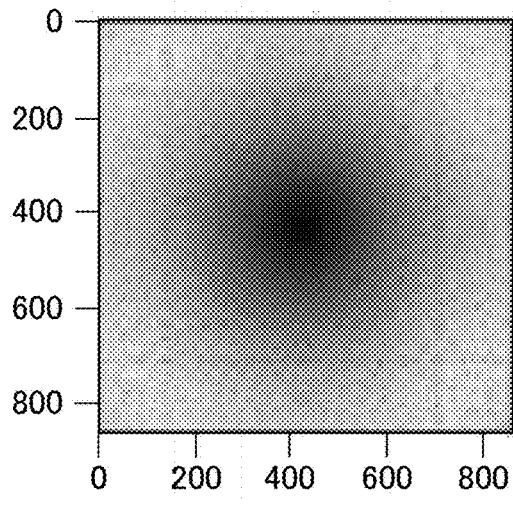
FIG. 4E is a diagram illustrating a frequency spectrum map obtained by the weighting calculator 12 in FIG. 1 multiplying the frequency spectrum shown in FIG. 4C by the weighting filter shown in FIG. 4D.

FIG. 4E shows a frequency spectrum map by the weighting calculator 12 multiplying the frequency spectrum shown in FIG. 4C by the weighting filter shown in FIG. 4D. As can be seen by comparing FIG. 3E with FIG. 4E, the frequency spectrum map shown in FIG. 4E has values larger than the frequency spectrum map shown in FIG. 3E and the whitish color is displayed.

As described above, the frequency spectrum map generated by the weighting calculator 12 becomes larger in value in each pixel as the high frequency components included in the input image signals increase. Similarly, the frequency spectrum map generated by the weighting calculator 22 becomes larger in value in each pixel as the high frequency components included in the output image signal increase.

Returning to FIG. 1, the summation calculators 13 and 23 calculate the summation of the values of each pixel of the frequency spectrum map output from the weighting calculators 12 and 22 in the frame F, respectively. The summation calculator 13 is a first summation calculator, and the summation calculator 23 is a second summation calculator. The summation of the values of each pixel of the frequency spectrum map calculated by the summation calculators 13 and 23 is a high frequency component index indicating a total amount of the high frequency components of the frequency spectrum map.

The summation calculator 13 functions as a first high frequency component index generator for generating a high frequency component index (first high frequency component index) based on the frequency spectrum output from the discrete Fourier transform unit 11. The summation calculator 23 functions as a second high frequency component index generator for generating a high frequency component index (second high frequency component index) based on the frequency spectrum output from the discrete Fourier transform unit 21.

It is not necessary but preferable to provide weighting calculators 12 and 22. When weighting calculators 12 and 22 are provided, the summation calculators 13 and 23 generate a high frequency component index based on a frequency spectrum map processed so that the high frequency components are dominant. As a result, the ratio of the high frequency components of the input image signal to be emphasized can be easily determined by the high frequency emphasis circuit 30.

The high frequency component emphasis ratio calculator 4 calculates a high frequency component emphasis ratio which is a ratio between the high frequency component index output from the summation calculator 13 and the high frequency component index output from the summation calculator 23. The high frequency component emphasis ratio calculator 4 should calculate the high frequency component emphasis ratio by dividing the high frequency component index output from the summation calculator 23 by the high frequency component index output from the summation calculator 13. The high frequency component emphasis ratio indicates the ratio of the high frequency components increased by emphasizing the high frequency components of an input image signal by the high frequency emphasis circuit 30 to the high frequency components of the input image signal. The high frequency component emphasis ratio is supplied to the emphasis amount controller 5.

The target emphasis ratio set by a user is input to the emphasis amount controller 5. The target emphasis ratio is 1.1, for example. The target emphasis ratio 1.1 means that the high frequency components of the input image signal are emphasized 1.1 times by the high frequency emphasis circuit 30. The emphasis amount controller 5 generates an emphasis amount control value according to a comparison result between the high frequency component emphasis ratio and the target emphasis ratio supplied from the high frequency component emphasis ratio calculator 4, and supplies it to the high frequency emphasis circuit 30.

Taking the target emphasis ratio 1.1 as an example, the emphasis amount controller 5 supplies the high frequency emphasis circuit 30 with an emphasis amount control value so that the emphasis amount of the high frequency components by the high frequency emphasis circuit 30 is controlled to be increased if the high frequency component emphasis ratio is smaller than the target emphasis ratio 1.1. The emphasis amount control value that controls to increase an emphasis amount of the high frequency components may be a positive value which is a value increasing as the degree of increasing the emphasis amount increases, for example.

The emphasis amount controller 5 supplies the high frequency emphasis circuit 30 with an emphasis amount control value so that the emphasis amount of the high frequency components by the high frequency emphasis circuit 30 is controlled to be decreased if the emphasis ratio of the high frequency components is larger than the target emphasis ratio 1.1. The emphasis amount control value that controls to decrease the emphasis amount of the high frequency components may be a negative value which is a value decreasing as the degree of decreasing the emphasis amount increases, for example.

The emphasis amount controller 5 supplies the high frequency emphasis circuit 30 with an emphasis amount control value so that the emphasis amount of the high frequency components by the high frequency emphasis circuit 30 is controlled not to be changed if the high frequency component emphasis ratio coincides with the target emphasis ratio 1.1. The emphasis amount control value that controls the emphasis amount of the high frequency components not to be changed may be set to 0, for example.

The high frequency emphasis circuit 30 controls the emphasis amount of the high frequency components of the input image signal according to the emphasis amount control value supplied from the emphasis amount controller 5. The output image signal with high frequency components emphasized by the high frequency emphasis circuit 30 is input to the discrete Fourier transform unit 21. Accordingly, the high frequency emphasis amount control device 101 includes a feedback control loop for automatically controlling the emphasis amount of the high frequency components by the high frequency emphasis circuit 30 to an emphasis amount corresponding to the target emphasis ratio set by the user in the emphasis amount controller 5.

An output image signal with an emphasis amount of the high frequency components automatically controlled to an emphasis amount corresponding to the target emphasis ratio by the high frequency emphasis circuit 30 is supplied to an unillustrated liquid crystal panel and displayed. The medical monitor may be provided with an organic EL panel instead of a liquid crystal panel, or may be provided with any display panel.

Figures 5, 6:
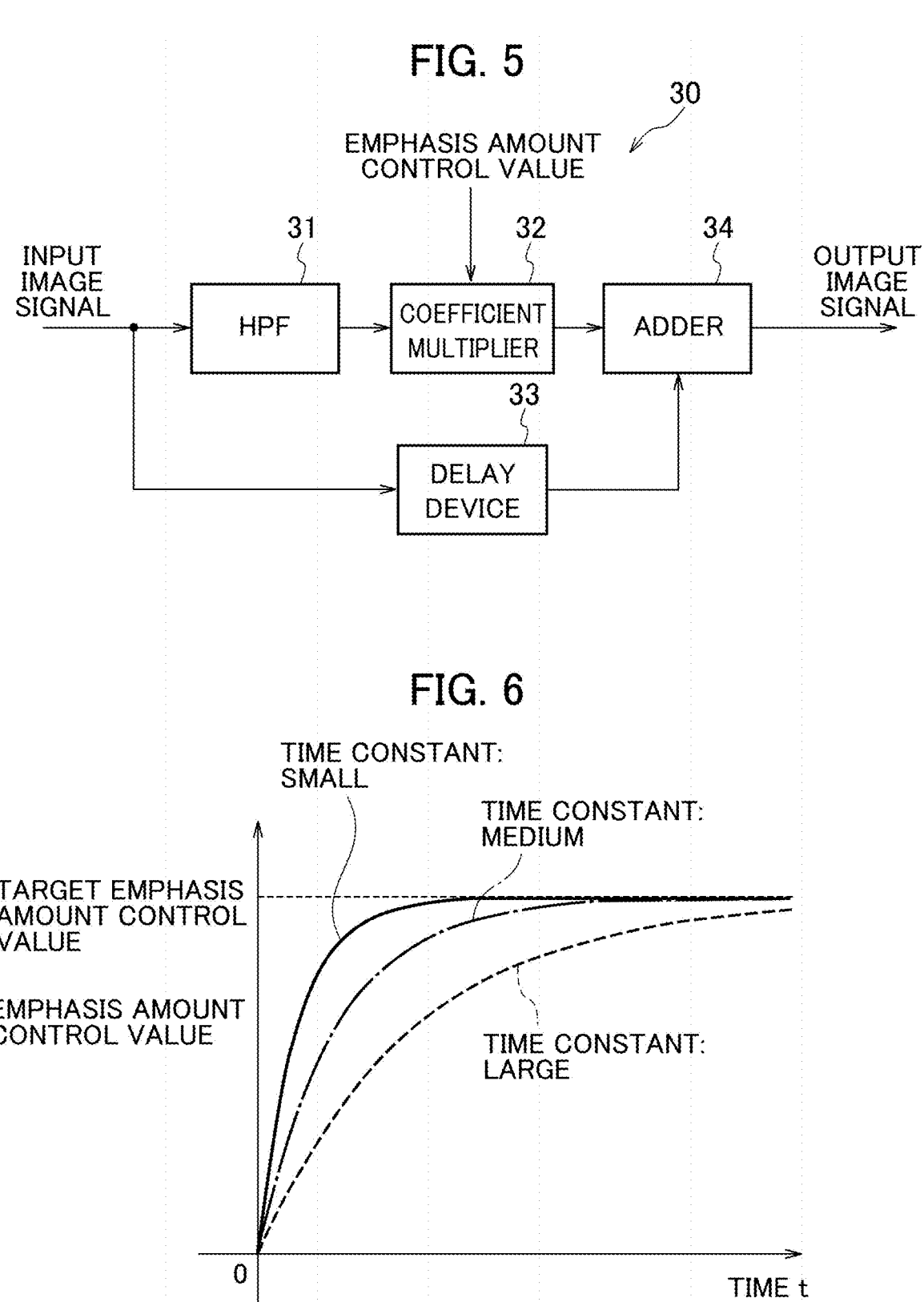
FIG. 5 is a block diagram illustrating a schematic configuration example of a high frequency emphasis circuit 30 shown in FIGS. 1, 9, and 12.
FIG. 6 is a characteristic diagram illustrating a time constant when the high frequency emphasis circuit 30 shown in FIGS. 1, 9, and 12 changes a control value of an emphasis amount.

FIG. 5 shows a schematic configuration example of the high frequency emphasis circuit 30. The high frequency emphasis circuit 30 includes a high pass filter (hereafter, referred to as HPF) 31, a coefficient multiplier 32, a delay device 33, and an adder 34. The HPF 31 extracts high frequency components of an input image signal. The coefficient multiplier 32 multiplies the extracted high frequency components by a coefficient to emphasize the high frequency components. The delay device 33 delays the input image signal by a time corresponding to the processing by the HPF 31 and the coefficient multiplier 32. The adder 34 adds the high frequency components output from the coefficient multiplier 32 to the input image signal delayed by the delay device 33 to generate an output image signal.

The coefficient multiplier 32 increases the value of the coefficient multiplied by the high frequency components when the emphasis amount control value that controls the emphasis amount of the high frequency components to be increased is supplied from the emphasis amount controller 5. The coefficient multiplier 32 decreases the value of the coefficient when the emphasis amount control value that controls the emphasis amount of the high frequency components to be decreased is supplied from the emphasis s amount controller 5. The coefficient multiplier 32 does not change the value of the coefficient when the emphasis amount control value that controls the emphasis amount of the high frequency components not to be changed is supplied.

The configuration example of the high frequency emphasis circuit 30 shown in FIG. 5 is merely an example, and the high frequency emphasis circuit 30 may have any configuration as long as it emphasizes the high frequency components of an input image signal. The high frequency emphasis circuit 30 may be an edge enhancement circuit, a contour correction circuit, or a circuit called an enhancer.

The high frequency emphasis amount control device 101 described above can automatically emphasize high frequency components of an image with an appropriate emphasis amount.

When the emphasis amount controller 5 changes an emphasis amount control value in a short period of time in the high frequency emphasis amount control device 101, a phenomenon called hunting in which the emphasis amount control value frequently fluctuates in the vicinity of the targeted emphasis amount control value (target emphasis amount control value) may occur. To avoid the occurrence of hunting, the emphasis amount controller 5 should be configured to output the target emphasis amount control value over a predetermined period of time by providing a time constant in the feedback control loop that generates and outputs the target emphasis amount control value.

FIG. 6 shows how the emphasis amount control value changes when the emphasis amount controller 5 changes the emphasis amount control value to a predetermined target emphasis amount control value given that the emphasis amount control value 0 is set before changing the emphasis amount control value. The target emphasis amount control value is obtained in a short time when the time constant is decreased as shown by the solid line. The target emphasis control value is obtained in a longer time than when the time constant is reduced when the time constant is medium as shown by the one-dot chain line. The target emphasis control value is obtained in a longer time when the time constant is increased as shown by the dashed line. The emphasis amount controller 5 sets a predetermined time constant to change the emphasis control value.

Figure 7:
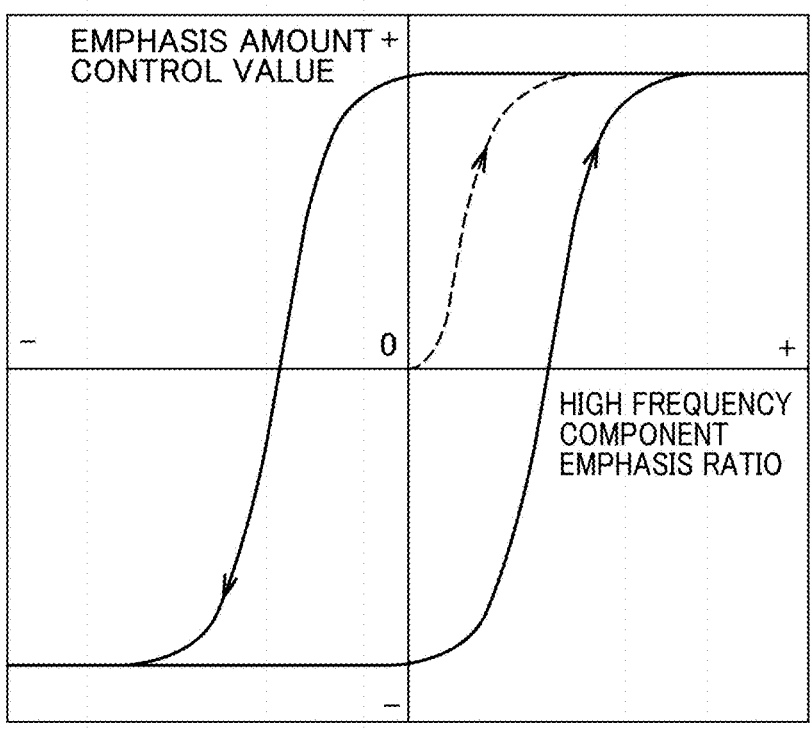
FIG. 7 is a characteristic diagram illustrating a hysteresis characteristic when the high frequency emphasis circuit 30 shown in FIGS. 1, 9, and 12 changes a control value of an emphasis amount.

The emphasis amount controller 5 may provide a hysteresis characteristic in a feedback control loop that generates and outputs the emphasis amount control value. FIG. 7 shows an example of a hysteresis characteristic. By providing hysteresis characteristic in the feedback control loop, the occurrence of hunting can be avoided.

As shown in FIG. 7, when the high frequency component emphasis ratio first increases in the positive direction from 0, the emphasis amount controller 5 sequentially increases the emphasis amount control value as shown by the dashed line. The emphasis amount controller 5 maintains the maximum value of the emphasis amount control value for a while when the high frequency component emphasis ratio decreases after the emphasis amount control value reaches the maximum value, and decreases the emphasis amount control value sequentially when the high frequency component emphasis ratio further decreases. When the high frequency component emphasis ratio increases after the emphasis amount control value reaches the minimum value, the emphasis amount controller 5 maintains the minimum value of the emphasis amount control value for a while, and, increases the emphasis amount control value sequentially when the high frequency component emphasis ratio further increases.

In this way, in order to avoid occurrence of hunting, it is preferable that the emphasis amount controller 5 changes the emphasis amount control value by a predetermined time constant or changes the emphasis amount control value according to a predetermined hysteresis characteristic.

Second Embodiment

Figure 8:
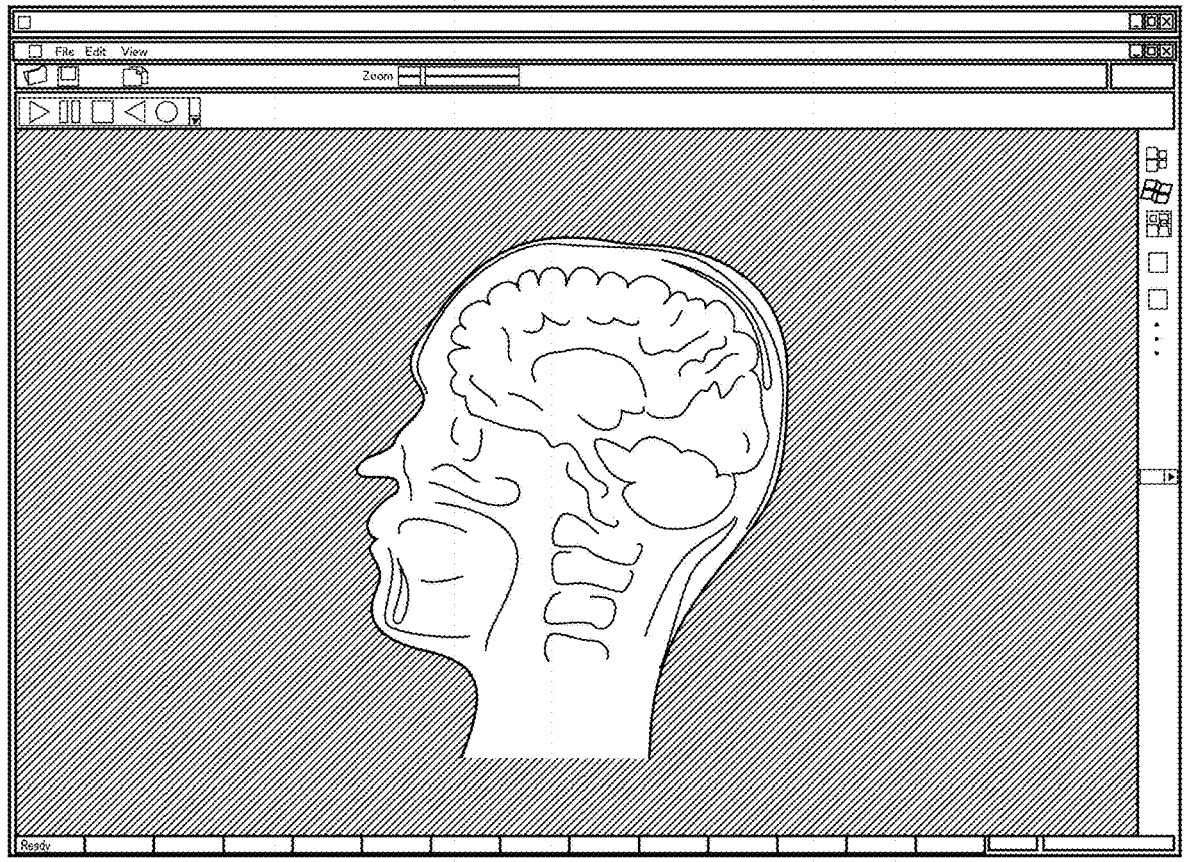
FIG. 8 is a diagram illustrating an example of a medical image displayed by a DICOM viewer on a medical monitor.

FIG. 8 shows an example of a medical image displayed by a DICOM viewer on a medical monitor. When a medical image is displayed on a medical monitor by a DICOM viewer, graphical user interface images (hereafter referred to as GUI images) such as window frames and menus are displayed on the medical monitor in addition to the medical image. Since the GUI image is a geometric figure, it contains steep edges and many high frequency components. Therefore, if a medical image as shown in FIG. 8 is used as an input image signal, and the high frequency components of the input image signal is emphasized by the high frequency emphasis circuit 30 to form an output image signal, the frequency spectrum map contains a large amount of high frequency components caused by the GUI image.

Figure 9:
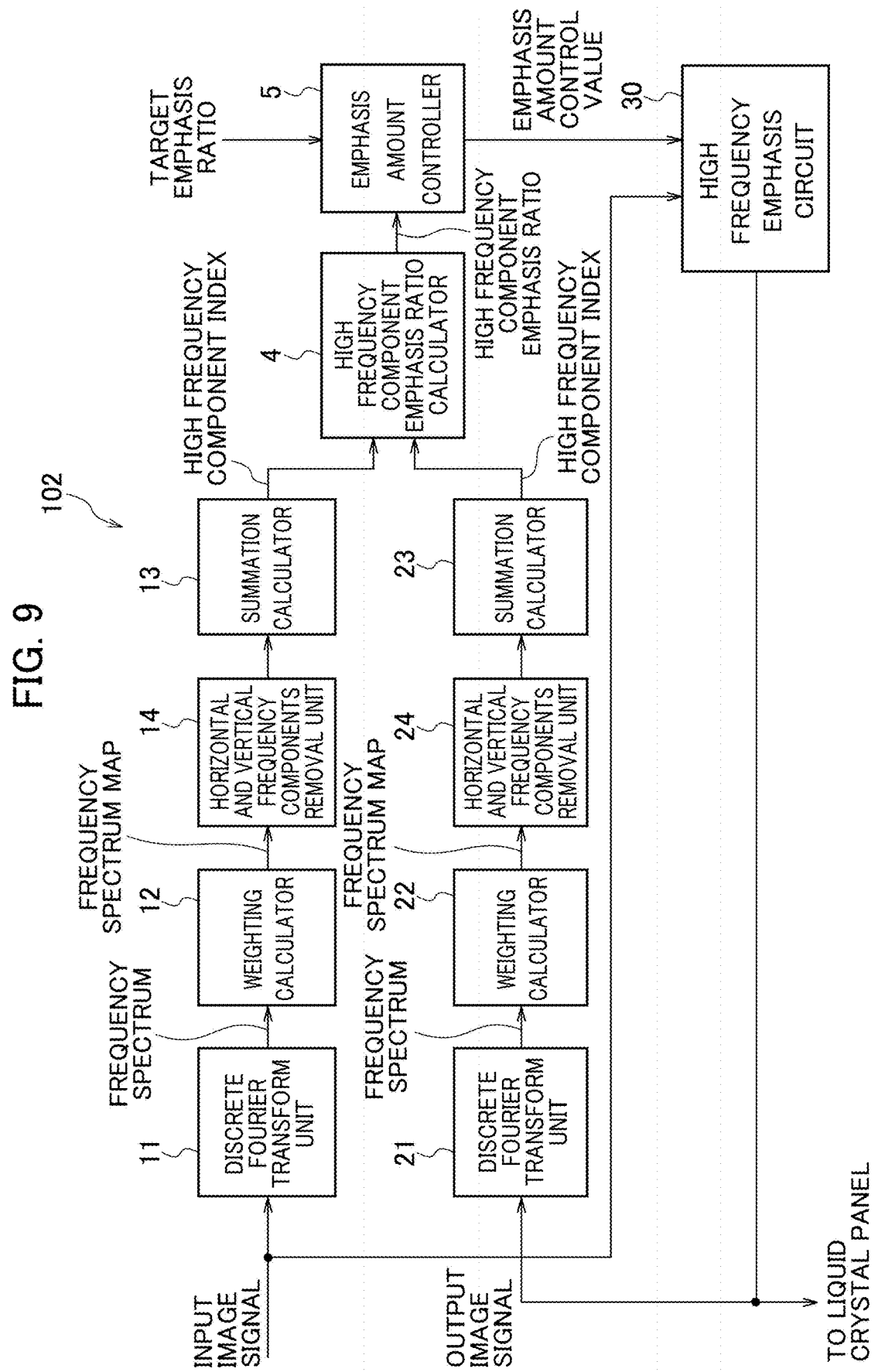
FIG. 9 is a block diagram illustrating a high frequency emphasis amount control device according to a second embodiment.

If the high frequency component index becomes a large value even though the original medical image do not contain many high frequency components, the high frequency component emphasis ratio does not show the ratio of high frequency components of the original medical image, and the emphasis amount control value may not be an appropriate value. A high frequency emphasis amount control device 102 according to a second embodiment shown in FIG. 9 generates an appropriate emphasis amount control value even if the input image signal contains high frequency components caused by the GUI image. In FIG. 9, the same portions as those in FIG. 1 are denoted by the same reference signs, and the description thereof may be omitted.

A GUI image often consists of a combination of horizontal and vertical lines, while a medical image hardly contains horizontal or vertical lines, as it is a natural image. Therefore, the horizontal and vertical frequency components included in the frequency spectrum map are mostly unnecessary high frequency components caused by the GUI image.

In FIG. 9, the horizontal and vertical frequency components removal units 14 and 24 (first and second horizontal and vertical frequency components removal units) remove the horizontal and vertical frequency components from the frequency spectrum map output from the weighting calculators 12 and 22, respectively. Horizontal and vertical frequency components removal units 14 and 24 multiply the frequency spectrum map by a cross-shaped filter for removing horizontal and vertical frequency components.

Figure 10A:
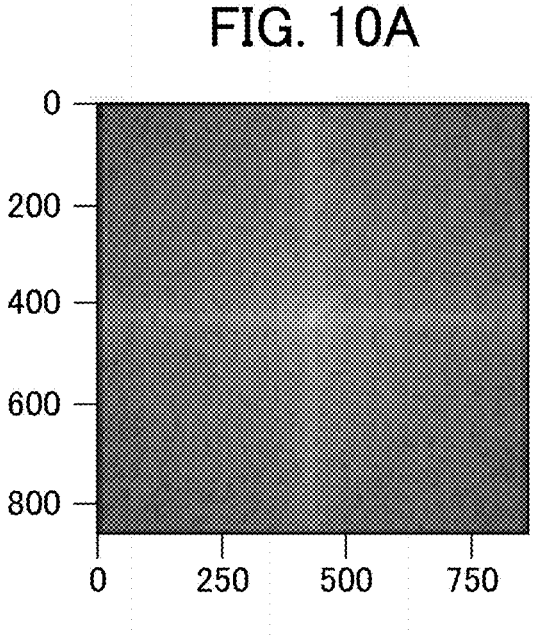
FIG. 10A is a diagram illustrating an example of a frequency spectrum map output from the weighting calculator 12 in FIG. 9.
Figure 10B:
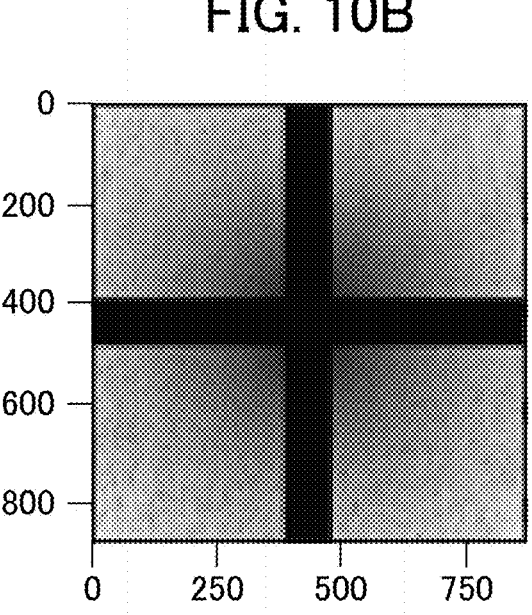
FIG. 10B is a diagram illustrating an example of a frequency spectrum map in which the horizontal and vertical frequency components are removed by a horizontal and vertical frequency components removal unit 14 in FIG. 9.
Figure 11A:
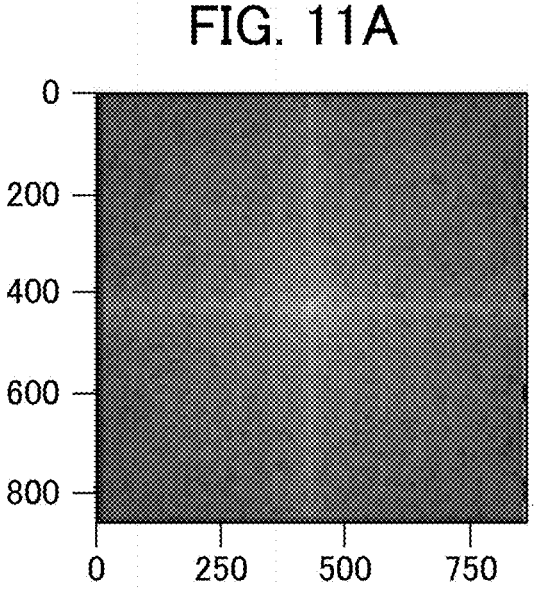
FIG. 11A is a diagram illustrating an example of a frequency spectrum map output from a weighting calculator 22 in FIG. 9.
Figure 11B:
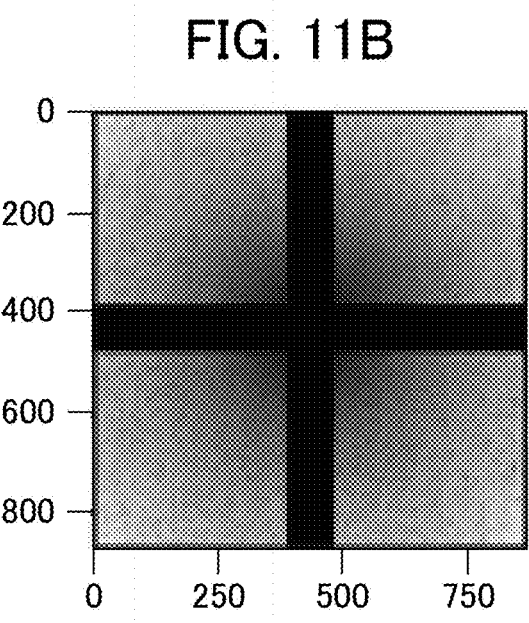
FIG. 11B is a diagram illustrating an example of a frequency spectrum map in which the horizontal and vertical frequency components are removed by a horizontal and vertical frequency components removal unit 24 in FIG. 9.

FIG. 10A shows a frequency spectrum map output from the weighting calculator 12. FIG. 10B shows a frequency spectrum map output from the horizontal and vertical frequency components removal unit 14. The horizontal and vertical frequency components are removed by the cross-shaped filter of the horizontal and vertical frequency components removal unit 14. FIG. 11A shows a frequency spectrum map output from the weighting calculator 22. FIG. 11B shows a frequency spectrum and vertical frequency map output from the horizontal components removal unit 24. The horizontal and vertical frequency components are removed by the cross-shaped filter of the horizontal and vertical frequency components removal unit 24.

In FIG. 9, the horizontal and vertical frequency components removal units 14 and 24 are provided after the weighting calculators 12 and 22, but may be provided before the weighting calculators 12 and 22. The functions of the horizontal and vertical frequency components removal units 14 and 24 may be provided in the weighting calculators 12 and 22. Specifically, the weighting calculators 12 and 22 may multiply the frequency spectra output from the discrete Fourier transform units 11 and 21 by a filter obtained by multiplying the inverted cone-like filter shown in FIG. 2 and the cross-shaped filter.

In the high frequency emphasis amount control device 102 described above, high frequency components of an image can be automatically emphasized with appropriate emphasis amounts. According to the high frequency emphasis amount controller 102, unnecessary high frequency components caused by the geometric figure can be removed to emphasize the high frequency components of the image with an appropriate emphasis amount when the input image signal includes a geometric figure including horizontal lines and vertical lines, such as a GUI image other than an image for which the high frequency components are to be emphasized.

In the high frequency emphasis amount control device 102, the emphasis amount controller 5 should change the emphasis amount control value with a predetermined time constant, and should change the emphasis amount control value according to a predetermined hysteresis characteristic.

Third Embodiment

Figure 12:
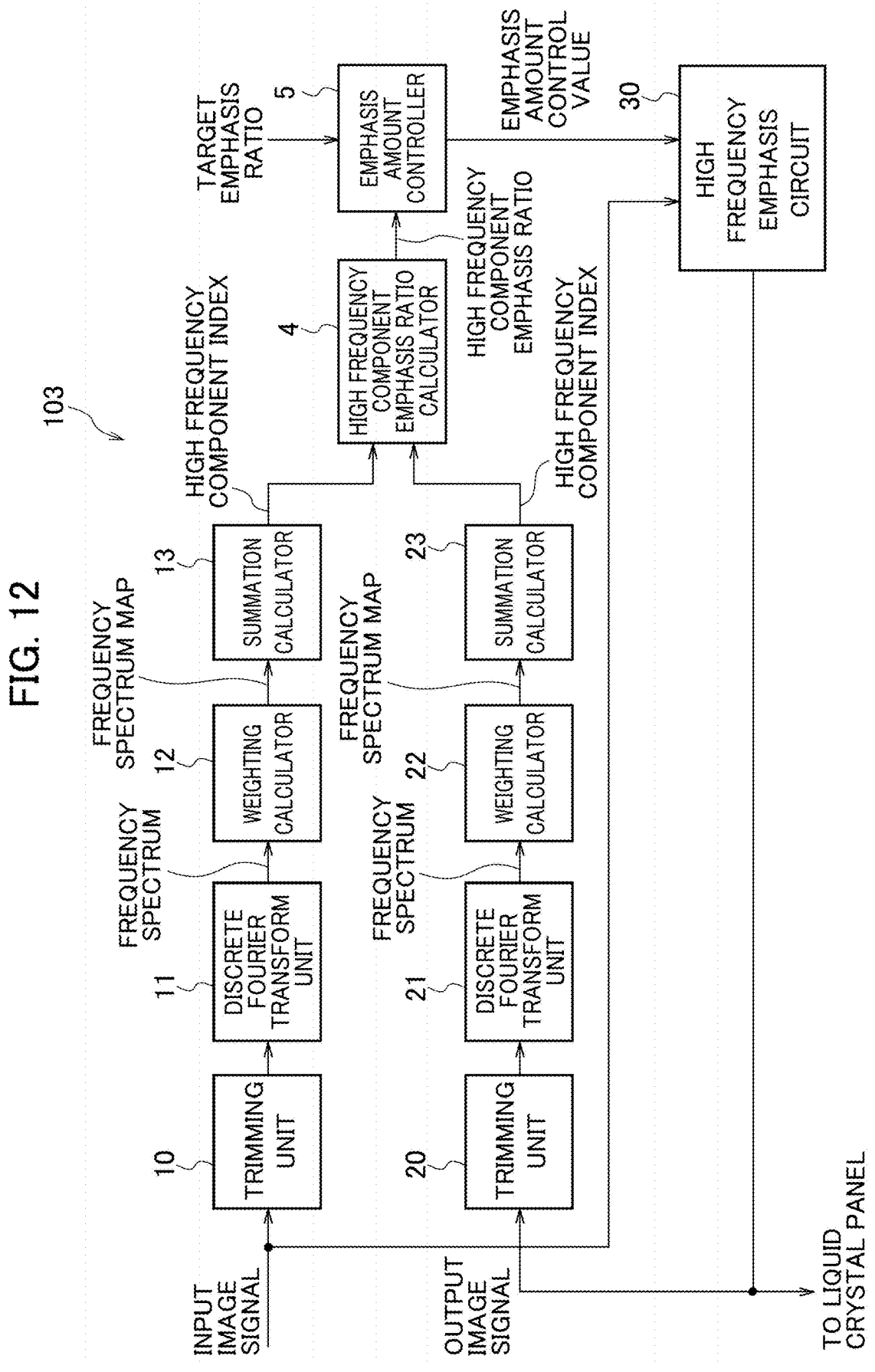
FIG. 12 is a block diagram illustrating a high frequency emphasis amount control device according to a third embodiment.

A high frequency emphasis amount control device 103 according to a third embodiment shown in FIG. 12 generates an appropriate value of the emphasis amount control value in a manner different from the high frequency emphasis amount control device 102 according to a second embodiment, even though the input image signal includes high frequency components caused by the GUI image. In FIG. 12, the same parts as those in FIG. 1 are denoted by the same reference signs, and the description thereof may be omitted.

As shown in FIG. 8, GUI images are often arranged at an upper and a lower or left and right ends of a frame, and medical images are often arranged at a center of the frame. Therefore, as shown in FIG. 12, the high frequency emphasis amount controller 103 includes trimming units 10 and 20 (first and second trimming units) before the discrete Fourier transform units 11 and 21.

The trimming unit 10 performs trimming so as to remove the upper, lower, left, and right ends of each frame in the input image signal, and to cut out a center portion. The trimming unit 20 performs trimming so as to remove the upper, lower, left, and right ends of each frame in the output image signal, and to cut out a center portion. The regions where the trimming units 10 and 20 cut out the input image signal and the output image signal, respectively, are the same. The extent to which the trimming units 10 and 20 cut out the center portion in the horizontal and vertical directions from the center of each frame can be set as appropriate.

Discrete Fourier transform units 11 and 21 perform two-dimensional discrete Fourier transform of an image signal in the center portion of each frame trimmed by trimming unis 10 and 20. Accordingly, the frequency spectra output from the discrete Fourier transform units 11 and 21 hardly contain any unnecessary high frequency components caused by the GUI image (geometric figure).

In the high frequency emphasis amount control device 103, the high frequency components of the image can be automatically emphasized with an appropriate emphasis amount, and the high frequency components of the image can be emphasized with an appropriate emphasis amount by removing unnecessary high frequency components caused by the geometric figure.

In the high frequency emphasis amount control device 103, the emphasis amount controller 5 should change the emphasis amount control value by a predetermined time constant, and the emphasis amount control value according to a predetermined hysteresis characteristic.

The present invention is not limited to first to third embodiments described above, and various modifications can be made without departing from the scope of the present invention.

What is claimed is:

1. A high frequency emphasis amount control device comprising: a processor and memory storing instructions, the processor configured to execute the instructions to perform operations comprising:

generating a first frequency spectrum by performing a two-dimensional discrete Fourier transform of an input image signal;

generating a second frequency spectrum by performing a two-dimensional discrete Fourier transform of an output image signal output from a high frequency emphasis circuit;

determining a first high frequency component index indicating a total amount of high frequency components based on the first frequency spectrum;

determining a second high frequency component index indicating a total amount of high frequency components based on the second frequency spectrum;

calculating a high frequency component emphasis ratio based on a ratio between the first high frequency component index and the second high frequency component index; and controlling an emphasis amount control value to the high frequency emphasis circuit, wherein the emphasis amount is increased when the high frequency component emphasis ratio is smaller than a target emphasis ratio, and the emphasis amount is decreased when the high frequency component emphasis ratio is larger than the target emphasis ratio, and the emphasis amount is maintained when the high frequency component emphasis ratio coincides with the target emphasis ratio.

2. The high frequency emphasis amount control device according to claim 1, further comprising:

a first weighting calculator configured to process the first frequency spectrum to generate a first frequency spectrum map so as to remove a low frequency component included in the first frequency spectrum and increase a high frequency component; and a second weighting calculator configured to process the second frequency spectrum to generate a second frequency spectrum map so as to remove a low frequency component included in the second frequency spectrum and increase a high frequency component, wherein the first high frequency component index generator is a first summation calculator configured to calculate a sum of values of each pixel of the first frequency spectrum map as the first high frequency component index in each frame; and the second high frequency component index generator is a second summation calculator configured to calculate a sum of values of each pixel of the second frequency spectrum map as the second high frequency component index in each frame.

3. The high frequency emphasis amount control device according to claim 2, further comprising:

a first horizontal and vertical frequency components removal unit which removes horizontal and vertical frequency components from the first frequency spectrum map; and a second horizontal and vertical frequency components removal unit which removes horizontal and vertical frequency components from the second frequency spectrum map.

4. The high frequency emphasis amount control device according to claim 1, further comprising:

a first trimming unit configured to perform trimming to cut out a center portion of each frame in the input image signal; and a second trimming unit configured to perform trimming to cut out a center portion of each frame in the output image signal.

5. The high frequency emphasis amount control device according to claim 1, wherein the emphasis amount controller is configured to change the emphasis amount control value by a predetermined time constant or to change the emphasis amount control value according to a predetermined hysteresis characteristic.

* * * * *